US005687412A

United States Patent [19]
McIntyre

[11] Patent Number: 5,687,412
[45] Date of Patent: Nov. 11, 1997

[54] CAMERA FOR SELECTIVELY RECORDING IMAGES RECORDED ON A PHOTOGRAPHIC FILM ON A MAGNETIC TAPE

[75] Inventor: Dale F. McIntyre, Honeoye Falls, N.Y.

[73] Assignee: Eastman Kodak Company, Rochester, N.Y.

[21] Appl. No.: 738,389

[22] Filed: Oct. 25, 1996

[51] Int. Cl.⁶ .................................................. G03B 17/24
[52] U.S. Cl. ........................... 396/319; 396/429; 348/64; 358/909.1
[58] Field of Search ........................... 396/281, 287, 396/300, 319, 320, 429, 535, 538; 348/64, 222, 231, 232, 233; 358/906, 909.1

[56] References Cited

U.S. PATENT DOCUMENTS

| | | | |
|---|---|---|---|
| 4,714,962 | 12/1987 | Levine | 358/209 |
| 4,742,369 | 5/1988 | Ishii et al. | 354/441 |
| 4,949,117 | 8/1990 | Van Heyningen et al. | 354/412 |
| 5,050,017 | 9/1991 | Carr et al. | 360/77 |
| 5,122,821 | 6/1992 | Nealon | 396/319 X |
| 5,130,745 | 7/1992 | Cloutier et al. | 355/40 |
| 5,389,984 | 2/1995 | Lovenheim | 354/76 |
| 5,450,149 | 9/1995 | Cocca | 354/106 |
| 5,561,458 | 10/1996 | Cronin et al. | 348/64 |

*Primary Examiner*—Howard B. Blankenship
*Attorney, Agent, or Firm*—Raymond L. Owens

[57] ABSTRACT

A camera for recording images on a photographic film in a cartridge and for recording selected ones of such recorded film images on a magnetic tape having tracks corresponding to image data fries and image identification data for each image data file in a cartridge is disclosed. The camera receives a cartridge which can contain either photographic film or magnetic tape. Optics are provided for recording an image of a subject on the photographic film when a photographic film cartridge is disposed in the cartridge. A digital image of a subject is stored as an image is being exposed on the photographic film. The camera is adapted to receive a cartridge containing magnetic tape for selectively recording files representing selected images from the image storage means onto the image data file tracks and image identification data onto the image identification data tracks of the magnetic tape.

7 Claims, 6 Drawing Sheets

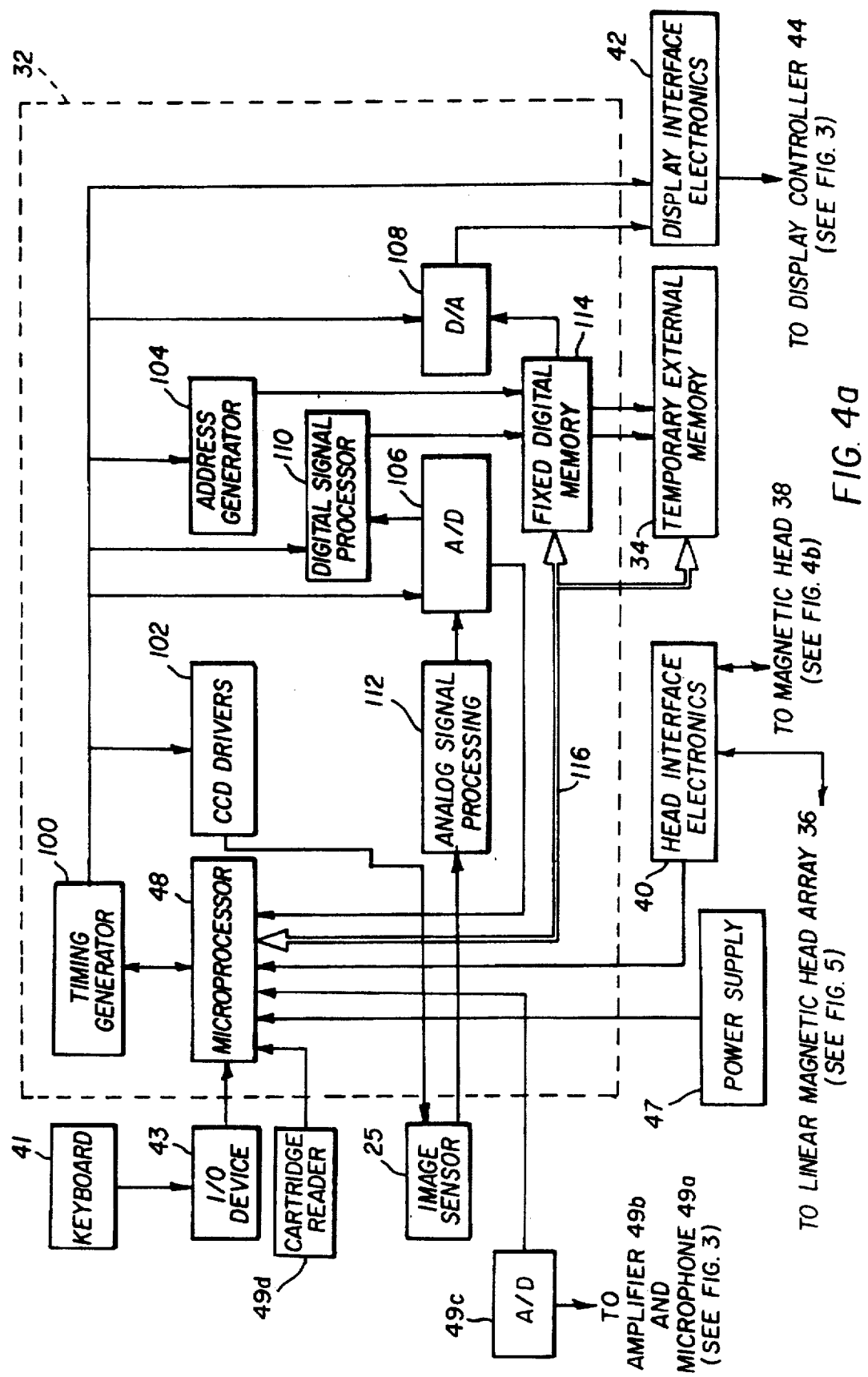

CAMERA FOR SELECTIVELY RECORDING IMAGES RECORDED ON A PHOTOGRAPHIC FILM ON A MAGNETIC TAPE

CROSS REFERENCE TO RELATED APPLICATIONS

The present invention is related to U.S. patent application Ser. No. 08/672,390, filed May 29, 1996, entitled "A Camera for Recording Images on a Photographic Film or on a Magnetic Tape", assigned to the assignee of the present invention. The disclosure of this related application is incorporated herein by reference.

FIELD OF THE INVENTION

The present invention relates to cameras which can record images on photographic film and images on electronic storage media such as magnetic tape.

BACKGROUND OF THE INVENTION

It has been recognized as a need for an image capture apparatus or system to substantially simultaneously capture both silver halide and electronic images. There are many variations on this theme. Generally, these cameras include conventional optics and film handling mechanisms for forming an image on film, and they also include a solid state imager and a display for forming and viewing an image. Such a camera can be used in a preview mode whereby a photographer can view an electronically recorded scene on the display without having to expose the film. The preview mode makes it convenient to arrange the composition and verify the exposure level before a permanent image is captured on film. The camera can also be operated in the review mode in which a photographer can view an image on the display which has also been captured on film. In this manner, important scenes like weddings and once in a lifetime vacations are verified as properly captured before leaving the scene.

One such camera is described in U.S. Pat. No. 4,742,369 to Iishi et. al. wherein an electronic still camera is disclosed that is adapted to form an image on a photosensitive film. The claims include a storage means that could be a floppy disk.

Again in U.S. Pat. No. 4,949,117 to Van Heyningen et al. a camera is described that has an electronic imager and display in addition to standard film capture. The electronic imager is used to control the parameters of image capture on film in addition to being directly responsible for the image of the electronic display.

In U.S. Pat. No. 5,389,984 to Lovenheim, a hybrid camera is described whereby a film image and a video image are simultaneously captured by sending capture signals in a controlled sense such that given known acquisition parameters dictate a simultaneous capture. The camera is additionally operatively attached to a computer for controlling said signals. In this case, the user has a severe constraint of being tied to a computer to control the camera.

In U.S. Pat. No. 4,714,962 to Levine, a dual electronic camera is shown that substantially concurrently captures electronic and silver halide images. The electronic image is used to preview or review images captured on silver halide. A recorder means is provided for recording instructions concerning the processing each of the frames. This recorder means might be the optical properties of the film or a separate memory or recorder.

The operation of the linear magnetic head array is well understood in the camera art and reference is made to commonly assigned U.S. Pat. No. 5,050,017 issued Sep. 17, 1991 to Carr et al, the disclosure of which is incorporated herein by reference.

In all of these cameras found in the prior art, the electronic image is used for preview or review and typically not stored or downloaded as an alternative to the film image. When the image is electronically stored, typically a solid state memory or a floppy disk is used. The cameras can't accept alternate media in place of the film to record the electronic image within the same mechanism used to hold and move the film. Another problem associated with electronic images is providing information which can identify the particular image.

SUMMARY OF THE INVENTION

It is an object of the present invention to provide a hybrid camera which can effectively store images on photographic film and on magnetic tape and identify, on the magnetic tape, selected images taken from the photographic film.

This object is achieved in a camera for recording images on a photographic film in a cartridge and for recording selected ones of such recorded fill images on a magnetic tape having tracks corresponding to image data files and image identification data for each image data fie in a cartridge, comprising:

a) means for receiving a cartridge which can contain either photographic film or magnetic tape;

b) optical means for recording an image of a subject on the photographic fill when a photographic film cartridge is disposed in the cartridge receiving means;

c) image storage means including an image sensor for storing an image of the subject as an image is being exposed on the photographic film; and d) means responsive to a cartridge containing magnetic tape being disposed in the cartridge receiving means for selectively recording files representing selected images from the image storage means onto the image data file tracks and image identification data onto the image identification data tracks of the magnetic tape.

Advantages

It is an advantage of the present invention that magnetic tape can be used to store selected electronic images and information identifying such images in a cost effective manner, in a camera that can also expose images on photographic film.

It is a further advantage of the invention that a single storage section of a camera can be used for receiving cartridges that selectively can have photographic film or magnetic tape.

A still further advantage is that identification information can be directly read from the film cartridge and this can be stored along with selected images on the magnetic tape.

A still further advantage is that audio information can also be stored on tracks on the magnetic tape to further identify selected images.

A still further advantage is to provide a hybrid camera which can operate as an electronic camera which transfers electronic images to memory and then selectively either transfer such images to a magnetic tape and permits a user to add identification information for such transferred images.

BRIEF DESCRIPTION OF THE DRAWINGS

FIGS. 4A and FIG. 4B perspectively shown block diagrams of the control circuit 32 and the head interface electronics 40;

DETAILED DESCRIPTION OF THE INVENTION

Figure 1:
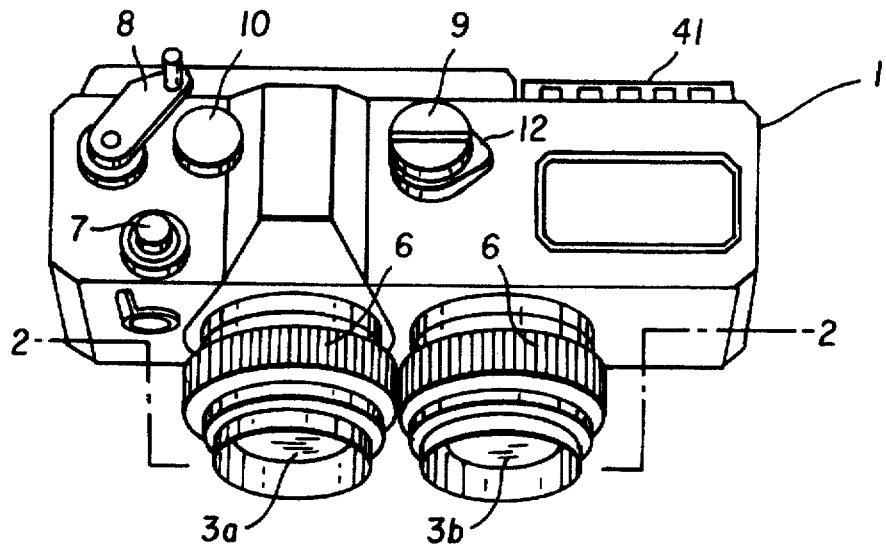
FIG. 1 is a perspective view of a hybrid dual lens camera in accordance with the present invention.

Turning now to FIG. 1, there is shown a hybrid dual lens camera having a hybrid camera main body 1; imaging lenses 3a and 3b; manually focusing mechanisms 6; a shutter switch including a self-return push-button switch 7; a wind-up lever 8; a shutter speed dial 9; a film rewind knob 10; and a film sensitivity dial 12. These components are the same as those in a normal camera.

Figure 2:
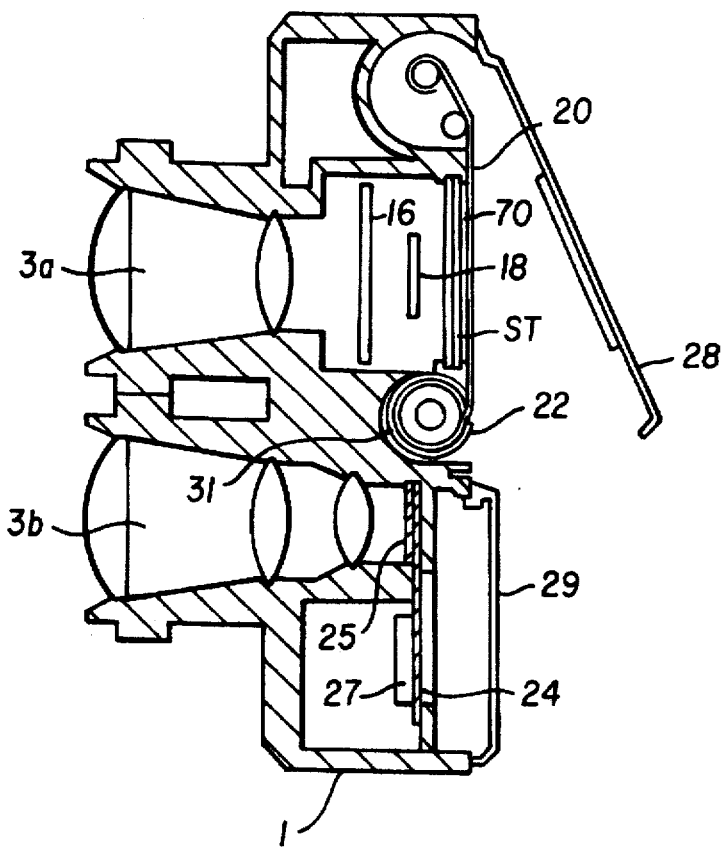
FIG. 2 is a cross sectional view of the camera shown in FIG. 1 taken along the lines 2—2.
Figure 5:
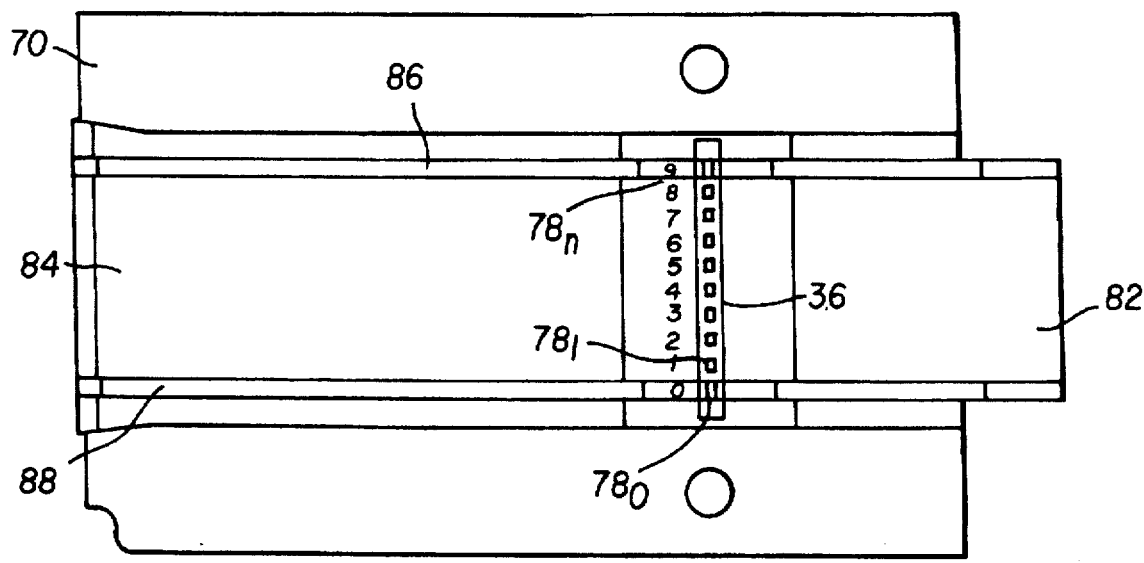
FIG. 5 is a top view of the relative positioning of a multitrack linear head with respect to the camera film rail and gate frame.
Figure 6:
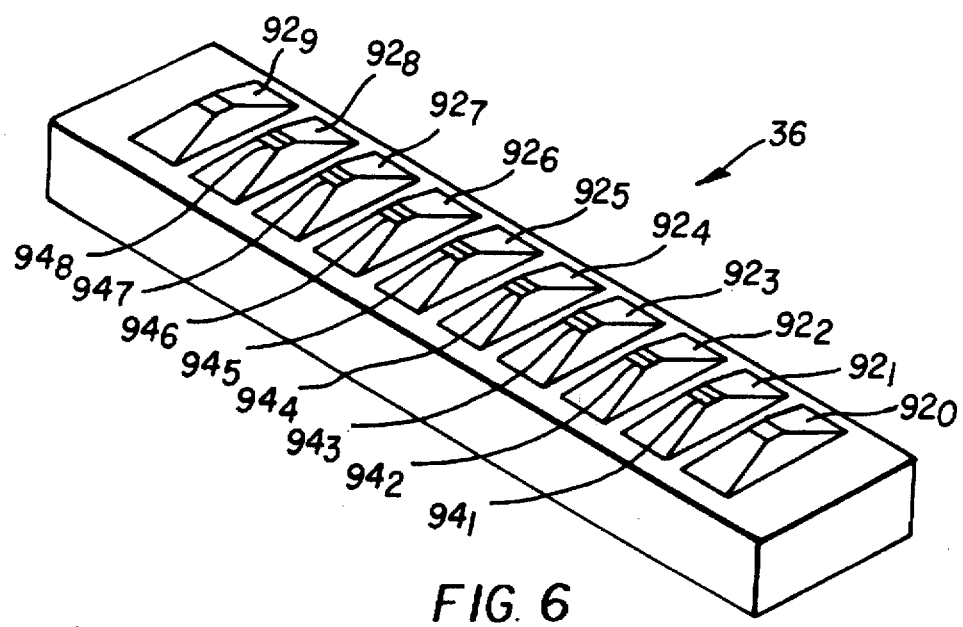
FIG. 6 is a perspective schematic view of the frustrums of one embodiment of a multihead array formed in accordance with the invention.

Turning now to FIG. 2 which is a cross sectional view which depicts the hybrid camera which includes a TTL automatic exposure function (not shown), and has a normal structure including a reflex mirror 16, submirror 18, shutter curtain ST, film 20 disposed in a cartridge 22. The cartridge 22 is removable from the camera body and a new cartridge 22, having substantially the same design as the film cartridge, can be inserted into the camera body. This new cartridge includes a magnetic tape. When this happens, a linear magnetic head array 36 is activated. This linear magnetic head array 36 is shown in FIGS. 5 and 6 and will be discussed later.

As is well known in the art, the substrate of the fill 20 can have on its rear side, coated a transparent magnetic layer. Another magnetic head 38, which is under the control of head interface electronics 40 (see FIGS. 4a and 4b), can be used to read and write information to the transparent magnetic storage layer. The head interface electronics 40 provides signals to either the linear magnetic head array 36 or magnetic head 38 in a conventional manner. Although two separate arrangements will be described for the linear magnetic head array 36 and the magnetic head 38, those skilled in the art will appreciate that a single magnetic head unit can be used to provide the functions of these heads. Magnetic head 38 typically includes two tracks which correspond to tracks $C_1$ and $C_2$ on the film 20. This arrangement will be discussed later in connection with FIG. 4b. For a more complete disclosure see, for example, commonly assigned U.S. Pat. No. 5,130,745 issued Jul. 14, 1992 to Cloutier et at, entitled "Film Information Exchange System Using Dedicated Magnetic Tracks on Film", the disclosure of which is incorporated by reference.

The hybrid camera includes an image sensor 25 arranged to coincide with the axis of the imaging lens 3b, and is electrically connected to a semiconductor chip 27 mounted on a printed circuit board 26. In this embodiment, respective rear covers 28 and 29 for the film and electronic portion of the hybrid camera are independently provided. As is well understood, a cartridge receiving structure 31 is provided within the hybrid camera body 1 and, in accordance with the present invention, can receive a cartridge which has either photographic film or magnetic tape.

Figure 3:
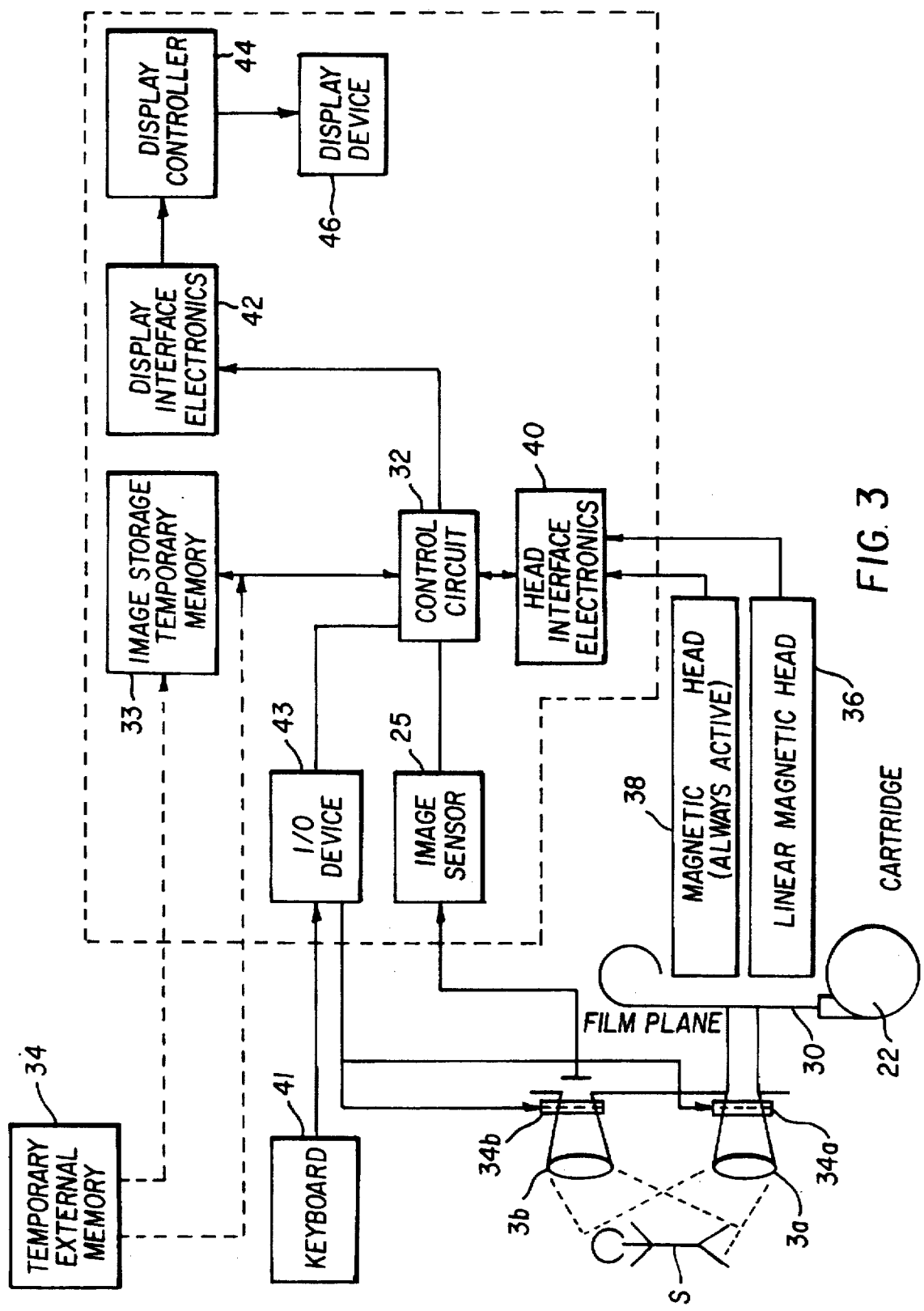
FIG. 3 is a block diagram of various elements of the hybrid camera system shown in FIG. 1.

In FIG. 3, a block diagram is shown of various systems within the hybrid camera 1. As shown, a subject S is positioned in from of the camera lenses 3a and 3b. An image of the subject is focused on a film plane 30 by the camera lens 3a of the cartridge 22 which contains photographic fill or magnetic tape. An image of the subject S is also focused by the camera lens 3b and other optical elements (not shown) upon the image sensor 25. Image sensor 25 can be a full frame charge coupled device (CCD) or, alternatively, can be an interline device with, for example, photodiode pixels which are adapted to deliver charge to interline CCDs. Conventional electronic circuitry (not shown) is associated with the image sensor 25. After the image sensor receives light representative of the image of the subject S, the circuitry sets up, acquires, and transfers electronic signals from the image sensor to circuitry for image processing. Such electronics are well known in the art and their description omitted for clarity of discussion. A control circuit 32 is adapted to transfer images from a digital memory 33 to display interface electronics 42. The display interface electronics 42 causes digital images to be delivered to a display controller 44 which, in turn, causes selected images to be shown on a display device 46, such as a liquid crystal display device 46. When the digital memory 33 is fully loaded, the control circuit 32 signals to the display interface electronics 42 an appropriate signal causing the display controller 44 to display information on the display device 46 indicating to the user that the digital memory 33 is full. The user then, via the keyboard 41, makes a decision whether to transfer the images in the display interface electronics 42 or to rewind the film cartridge 22 and insert a cartridge 22 containing magnetic tape which will be discussed in detail later. The arrangement of such type of a display structure is well known in the art and used on many commercially available cameras such as the Casio QV-10 digital still camera. The control circuit 32 controls an digital memory 33. In operation, shutter mechanisms 34a and 34b (shown schematically as dotted lines) of the hybrid camera are simultaneously operated and images of the subject S are directed to the photographic film plane 30 for recording on the photographic film and onto the image sensor 25. The operation of the shutters is as best shown in FIG. 3 under the control of an input/output device 43 such that when a magnetic cartridge is loaded into the camera, the shutter 34a is disabled and prevents light from the subject from illuminating the photographic film plane 30. This is actually accomplished by the linear magnetic head array 36 detecting the presence of a prerecorded signal on the magnetic tape. The digital memory 33 may include transistors that can store a number of images as is well known to those skilled in the art. Each time an image is to be photographed on the film, a corresponding image is stored in digital memory 33. Another temporary external memory 34 is shown which is external to the camera itself and can either receive or deliver signals directly under the control of the control circuit 32.

The linear magnetic head array 36 is under the control of the head interface electronics 40. In accordance with the present invention, after a cartridge 22 having a magnetic tape is inserted into the camera, the magnetic head 38 detects the presence of a cartridge 22 having magnetic tape and provides a signal to the head interface electronics 40 that a magnetic tape is now in the camera. Under the control of a user, the keyboard 41 mounted on the camera body as shown in FIG. 1 sends signals through input/output device 43 into control circuit 32 which causes data representing images to be selectively transferred to the head electronics 40 which, in turn, controls the writing of such image data via the linear magnetic head array 36 in tracks corresponding to image flies which will be discussed hereinafter. The keyboard 41 can also be mounted external to the camera.

More particularly, the keyboard 41 signals the control unit 32 to transfer selected images from the digital memory 33 through the control unit 32 and the head interface electronics 40 to the linear magnetic head array 36. The linear magnetic head array 36 records such images onto image data file tracks of the magnetic tape. In addition, the keyboard permits a user to enter identification information for selected images which can then be recorded onto information identification tracks.

Audio information can also be selectively recorded on an annotation data track. In accordance with the present invention, a microphone 49a sends signals to an amplifier 49b which are then delivered to an analog to digital converter 49c. The keyboard 41 via I/O device 43 has signaled to the control unit at this time that audio information is to be recorded onto the annotation track of a magnetic tape. Identification information can also be recorded by means of a cartridge reader 49d. Typically, bar codes are recorded on a cartridge which contain cartridge identification codes. The cartridge reader can, of course, be a conventional bar code reader which is commercially available. Alternatively, a magnetic strip can be placed on the bar code and read by a reader such as shown in U.S. Pat. No. 5,159,365.

Turning now to FIG. 4a, where a more detailed block diagram is shown of control circuit 32. The control circuit 32 is shown to receive inputs from input/output device 43, which is under the control of keyboard 41. It will be understood that a user operating the keyboard signals the control unit as to the operating condition of the camera. For example, whether audio information sent by microphone 49a via analog to digital converter 49c to the microprocessor for recording on an annotation magnetic track Also, the cartridge reader 49d sends its identification information the microprocessor 48 when a photographic cartridge is inserted into a camera. Also shown external to the control circuit 32 are the head interface electronics 40, temporary external memory 34, and display interface electronics 42, all previously discussed with reference to FIG. 3. Moreover, a power supply 47 is shown to provide power to a microprocessor 48. The microprocessor 48 receives an input from the input/output device 43 and provides control signals to a conventional timing generator 100. The timing generator 100 controls CCD drivers 102, an address generator 104, signal processing circuitry 110, and also provides signals to an analog-to-digital converter 106 and to display interface electronics 42, as well as to a digital-to-analog converter 108. The CCD drivers, of course, control the image sensor 25 which, in rum, provides analog signals to analog signal processing circuitry 112. The analog signal processing circuitry 112 delivers signals to the analog-to-digital converter 106 which provides timing information back to the microprocessor 48 and under the control of the timing generator 100, delivers digital signals to digital signal processing circuitry 110. The digital signal processing circuitry 110 provides an input to a fixed digital memory 114. The address generator 104 causes digital information to be delivered either to the temporary external memory 34 or to the digital-to-analog converter 108. The digital-to-analog converter 108, under the control of the timing generator 100, provides input signals to the display interface electronics 42. In response to signals from timing generator 100, the display interface electronics 42 delivers image signals to the display interface electronics 42 shown in FIG. 3.

Figure 4B:
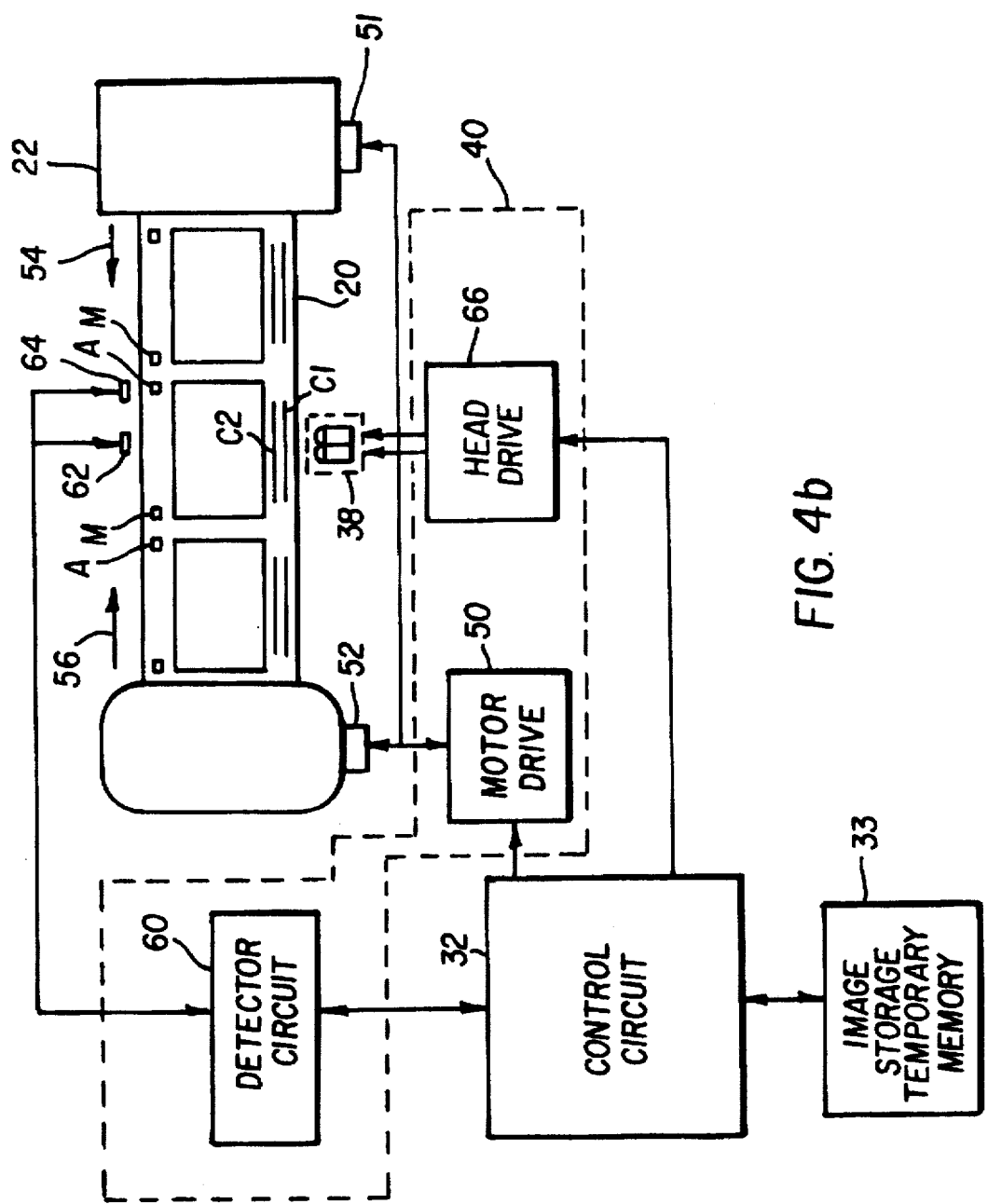

Turning now to FIG. 4b, where a more detailed block diagram shows the head interface electronics 40. In FIG. 4b, portions of the hybrid camera main body 1 associated with magnetic recording of data on film in accordance with the present invention are shown. The control circuit 32, as discussed above, controls various functions of the camera operation. Other photographic data, such as date, time, exposure information, scene orientation, and frame format can be provided in a well known manner within control circuit 32. Digital memory 33, which may be provided by an EEPROM stores image data prior to writing it to a magnetic tape. A motor drive 50 is mechanically coupled to an internal spool 51 of the cartridge 22 and to a take-up spool 52. The detail construction of the spools 51 and 52 are, of course, conventional. The motor drive 50 is operated under the control of the microprocessor 48 of control circuit 32 advances the film 20 in a first direction represented by arrow 54 from the cartridge 22 to the take-up spool 52, frame by frame, as each image frame 55 is exposed. Once all frames are exposed, motor drive 50 is operative to rewind the film in a second direction represented by arrow 56 from the take-up spool 52 to the film cartridge 22 in one continuous motion. A detector circuit 60 is coupled between control circuit controller 32 and opto-sensors 62 and 64 to sense apertures A and M to control frame by frame advance of the film and recording data in tracks $C_1$ and $C_2$. In conjunction with detector circuit 60 and control circuit 32, opto-sensor 64 serves as a metering sensor responsive to detection of metering perf M to position image frame areas 65 properly within the camera exposure gate (not shown). Opto-sensor 64 serves as a velocity sensor responsive to detection of anticipation peff A to sense the velocity of the film as it is being transported. Data recording in parallel longitudinal data tracks $C_1$ and $C_2$ is accomplished by means of magnetic head 38 driven by head drive 66 under the control of the microprocessor 48 of the control circuit controller 32. The details of film 20 and the magnetic recording layer thereon are fully described in aforementioned U.S. Pat. No. 5,130,745, the disclosure of which is incorporated herein by reference. For a more complete disclosure of the operation of magnetic head 38, see commonly assigned U.S. Pat. No. 5,450,149 issued Sep. 12, 1995 to Cocca entitled "Photographic Camera and Method for Recording Magnetic Data on Film", the disclosure which is incorporated herein by reference.

Figure 7:
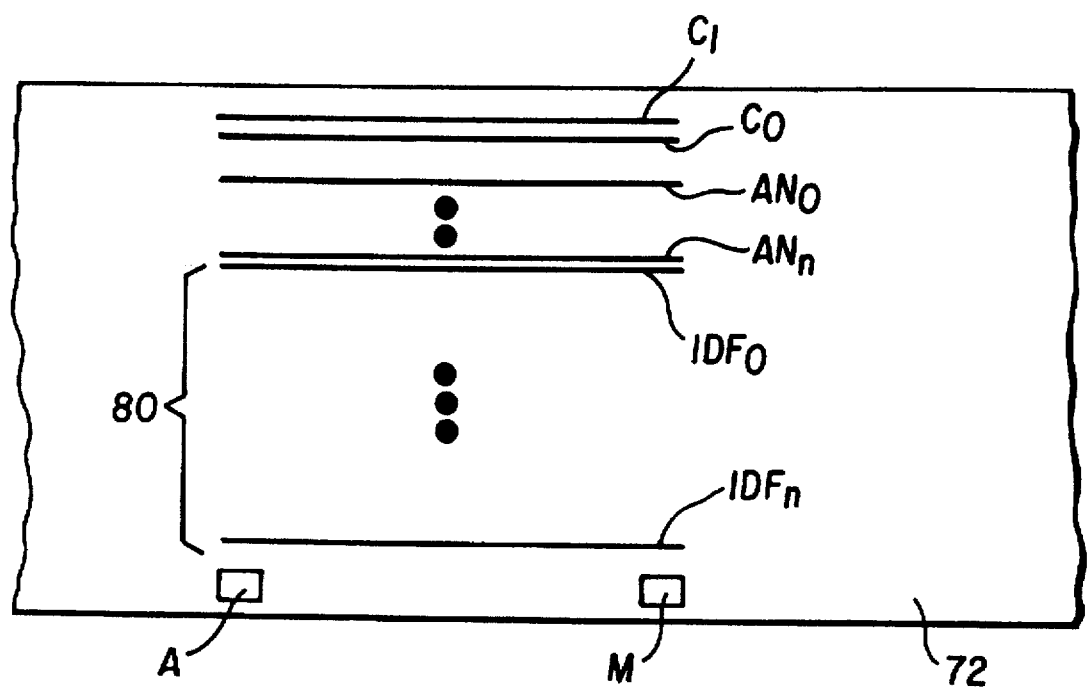
FIG. 7 shows a portion of a strip of magnetic tape having tracks which correspond to image files, image identification data, and annotation data.

Turning now to FIG. 5 where the film rail and gate frame structure 70 located in hybrid camera main body 1 is shown. For a more complete discussion of such structure, see U.S. Pat. No. 5,502,528, the disclosure of which is incorporated herein by reference. A magnetic tape 72 will be understood to include a high density ferromagnetic structure such as found in conventional video or audio tape cassettes. For an example of such a structure, see commonly assigned U.S. patent application Ser. No. 08/637,116 filed Apr. 24, 1996 of Mcintyre and Lee. As shown, there are a plurality of recording tracks $78_1, \ldots, 78_n$ in which an image frame may be recorded in the tracks. The tracks are aligned with the active head gaps 94 of the linear magnetic head array 36. For the purpose of this disclosure, reference should now be made to FIG. 7 wherein a strip of magnetic fill (understood to be in the magnetic cartridge 22) has the plurality of tracks shown in FIG. 5, but which are labeled to correspond to information and data to be stored. For example, each selected image will be recorded as an image data file 80 on image data fie tracks $IDF_0$-$IDF_n$. An image data file 80 is, of course, where images are to be recorded. The start of an image file can be identified by the perforation A and the end of the image file by perforation M. See also FIG. 4b. Annotation information in the form of text or audio information is recorded on tracks $AN_0 \ldots AN_n$. Moreover, tracks $C_0$-$C_1$ are used to record the image identification information taken from a photographic cartridge 22 by the cartridge reader 49d.

With reference to FIG. 4b and FIG. 5, the leading edge of the magnetic tape 72 is thrust forward from a tape supply side 82 of cartridge 22 which includes the internal spool 51 to the take-up side 84 of cartridge 22 which includes take-up spool 52. The control of the spools is again by the driver motor 50 which, in turn, is controlled by the microprocessor 48 within the control circuit 32. As shown in FIG. 5, there are two rails 86 and 88, which are part of the film rail and gate frame structure 70. The operation of this type of structure is well known in the art and disclosed in detail in the above-referenced U.S. Pat. No. 5,502,528.

FIG. 6 shows the relative position of tracks 78 of the linear magnetic head array 36 in relation to the magnetic tape transport path. The linear magnetic head array 36 is a linear array of discrete heads in the shape of n=10 frustums $92_0$-$92_9$ containing at least eight or more active head gaps $94_1$-$94_8$. It should be noted that the tracks to be recorded on the magnetic tape are numbered $78_1$-$78_n$, where n is equal to 8. These tracks correspond to those identified more particularly in FIG. 7. Although not shown, it will be understood that the linear magnetic head array 36 includes a plurality of ferrite core heads with associated coils for each one of the active head gaps $94_1$-$94_8$. It is the magnetic flux created in the air gap that causes information to be recorded on one of the data tracks. However, once information has been recorded in the magnetic tape 72, tape movement induces a change in the flux in the head gaps 94 that causes information to be exchanged as is well known in the art. Thus, it should be clear that the linear magnetic head array 36 can operate in both a record and playback mode. The linear magnetic head array 36 provides recording signals but also is adapted to receive signals in a playback mode. As shown in FIG. 4a, in the playback mode, the head interface electronics 40 delivers data to the microprocessor 48. Thereafter, the microprocessor 48 delivers data bus 116 to either the fixed digital memory 114 or to temporary external memory 34 for further processing as discussed above.

In operation, after a selected number of films have been recorded on a photographic film, an operator can operate the keyboard 41 and disable the shutters 34a and 34b and cause the motor drive 50 to rewind the exposed film into internal spool 51 of cartridge 22. At the same time that photographic images are recorded on film, the same images are delivered to image sensor 25 processed and stored in digital memory 33. The cartridge reader 49d also reads cartridge image identification at the time a photographic film cartridge is being inserted into the camera and this information is also stored in digital memory 33. Cartridge 22 can now be removed from the camera and another cartridge 22 with magnetic tape can be inserted into the camera or, alternatively, another cartridge containing photographic film can also be inserted into the cartridge receiving structure 31. In the event that an operator does not have photographic film available he, of course, can insert a cartridge 22 containing a magnetic tape into the camera and record directly onto such tape.

A user will signal, by way of keyboard 41, that audio information is to be recorded on tracks $AN_0$-$AN_n$ and also if text is to be recorded on the same tracks. The cartridge identification information, which has previously been read by cartridge reader 49d, is recorded in tracks $C_0$-$C_1$. A user can therefore select the images and information identifying such images to be selectively recorded on the magnetic tape from the digital images stored in the image data files.

The invention has been described in detail with particular reference to a certain preferred embodiment thereof, but it will be understood that variations and modifications can be effected within the spirit and scope of the invention. For example, images can be directly exposed onto the image sensor 25 without any cartridge 22 being inserted into the cartridge receiving structure 31 and, in such a case, the camera would operate as a conventional electronic camera with the exception that the stored images could be transferred onto a magnetic tape of a cartridge 22 after such cartridge is inserted into the camera.

Parts List 1 hybrid camera main body
3a a imaging lenses
3b imaging lenses
6 manually focusing mechanisms
7 shutter switch
8 wind-up lever
9 shutter speed dial
10 film rewind knob
12 film sensitivity dial
16 reflex mirror
18 submirror
20 film
22 cartridge
25 image sensor
27 semiconductor chip
28 rear covers
29 rear covers
30 photographic film plane
31 cartridge receiving structure
32 control circuit
33 digital memory
34 temporary external memory
34a a shutter mechanism
34b shutter mechanism
36 linear magnetic head array
38 magnetic head
40 head interface electronics
41 keyboard Parts List (con't)

42 display interface electronics
43 input/output device
44 display controller
46 display device
47 power supply
48 microprocessor
49a microphone
49b amplifier
49c analog to digital converter
49d cartridge reader
50 motor drive
51 internal spool
52 take-up spool
54 arrow
55 image frame
56 arrow
60 detector circuit
62 opto-sensors 64 opto-sensor
65 image frame areas
66 head drive
70 film rail and gate frame structure
72 magnetic tape
78 tracks
80 image data file
82 tape supply side
84 take-up side
86 rails Parts List (con't)

88 rafts
94 head gaps
100 conventional timing generator
102 CCD drivers
104 address generator
106 analog-to-digital converter
108 digital-to-analog converter
110 signal processing circuitry
112 analog signal processing circuitry
114 fixed digital memory
116 data bus

I claim:

1. A camera for recording images on a photographic film in a cartridge and for recording selected ones of such recorded fill images on a magnetic tape having tracks corresponding to image data files and image identification data for each image data file in a cartridge, comprising:
   a) means for receiving a cartridge which can contain either photographic fill or magnetic tape;
   b) optical means for recording an image of a subject on the photographic film when a photographic film cartridge is disposed in the cartridge receiving means;
   c) image storage means including an image sensor for storing an image of the subject as an image is being exposed on the photographic film; and
   d) means responsive to a cartridge containing magnetic tape being disposed in the cartridge receiving means for selectively recording files representing selected images from the image storage means onto the image data file tracks and image identification data onto the image identification data tracks of the magnetic tape.

2. The camera of claim 1 further including:

e) means for manually recording the image identification data.

3. A camera for recording images on a photographic film in a cartridge having machine readable identification data and for recording selected ones of such recorded film images on a magnetic tape having tracks corresponding to image data files and image identification data for each image data file in a cartridge, comprising:
   a) means for receiving a cartridge which can contain either photographic fill or magnetic tape;
   b) optical means for recording an image of a subject on the photographic film when a photographic film cartridge is disposed in the cartridge receiving means;
   c) means for reading cartridge identification data from a photographic cartridge;
   d) image storage means including an image sensor for simultaneously storing an image of the subject as an image is being exposed on the photographic film and for storing image identification data from the photographic cartridge; and
   e) means responsive to a cartridge containing magnetic tape being disposed in the cartridge receiving means for selectively recording files representing images from the image storage means onto the image file tracks and the image identification data onto the image identification data tracks and photographic cartridge identification data of the magnetic tape.

4. The camera of claim 3 wherein the magnetic tape includes one or more tracks for recording annotation information and further including:
   e) means for recording annotation information corresponding to each selected image onto the annotation track.

5. The camera of claim 4 wherein the annotation information includes audio information and further including means for recording such audio information on at least one of the annotation tracks.

6. The camera of claim 4 wherein the annotation information is text and further including means for recording such text on at least one of the annotation tracks.

7. In the camera of claim 4 further including display means for displaying an image of the subject to be photographed.

* * * * *